Jan. 9, 1934.   G. B. HIRSCH   1,942,599
FREQUENCY CONTROL DEVICE
Filed Aug. 31, 1929   5 Sheets-Sheet 1
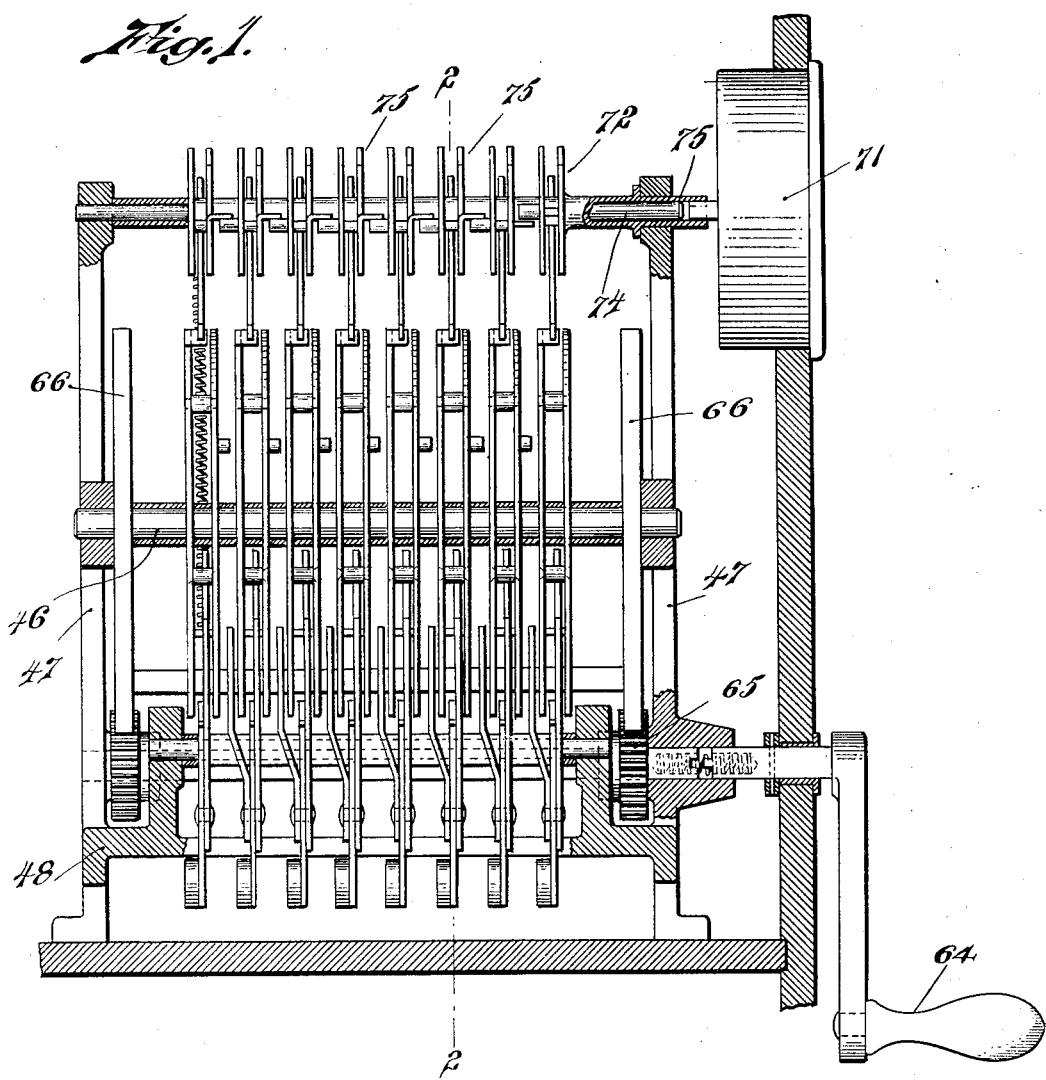
Fig. 1.
Fig. 9.   Fig. 10.
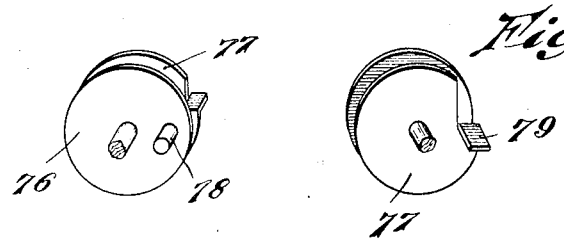
INVENTOR.
George B. Hirsch
BY Barlow & Barlow
ATTORNEYS.

Jan. 9, 1934.    G. B. HIRSCH    1,942,599
FREQUENCY CONTROL DEVICE
Filed Aug. 31, 1929    5 Sheets-Sheet 2

INVENTOR.
George B. Hirsch
BY Barlow & Barlow
ATTORNEYS.

Jan. 9, 1934.  G. B. HIRSCH  1,942,599
FREQUENCY CONTROL DEVICE
Filed Aug. 31, 1929   5 Sheets-Sheet 3

INVENTOR.
George B. Hirsch
BY Barlow & Barlow
ATTORNEYS.

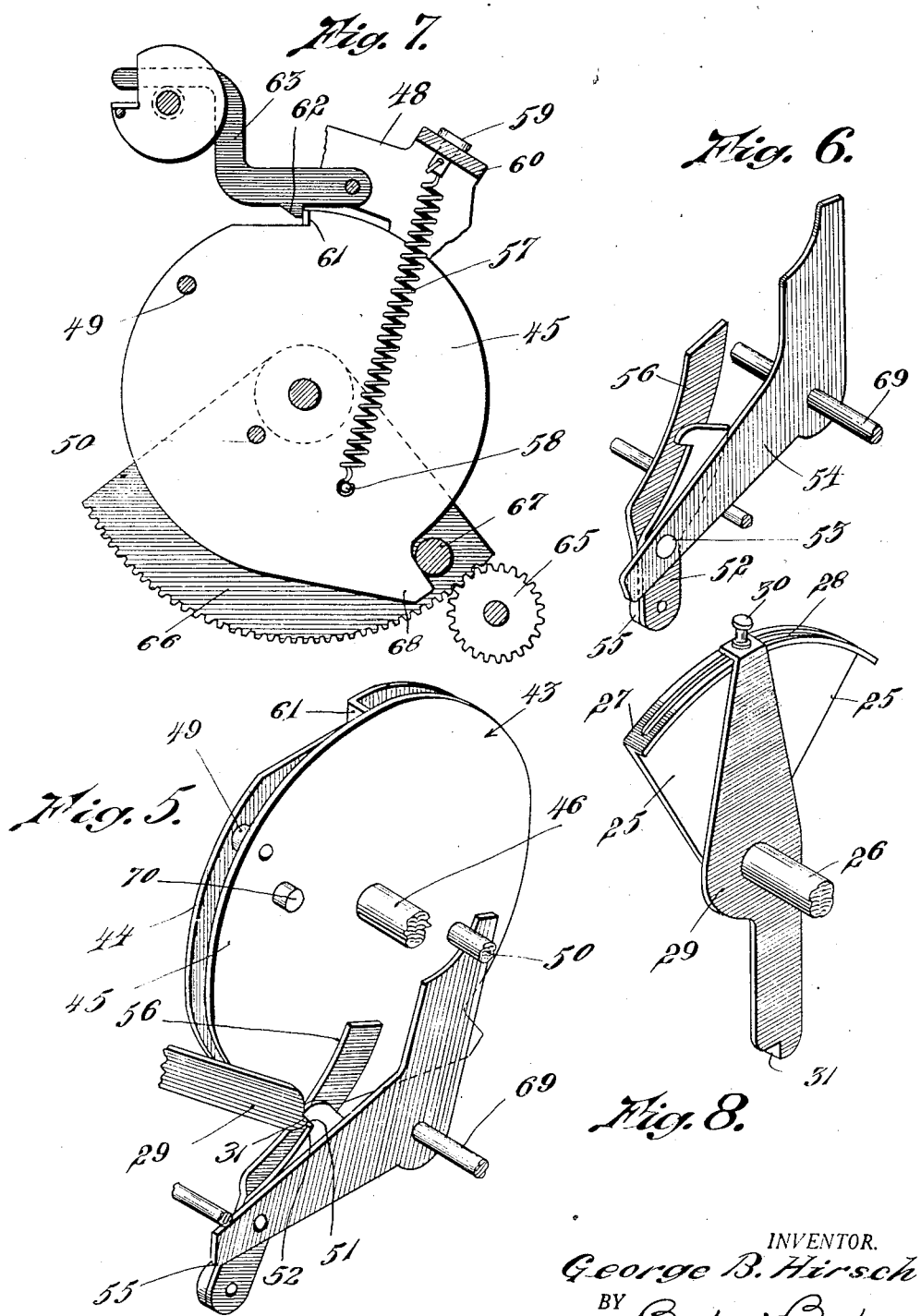

Jan. 9, 1934.   G. B. HIRSCH   1,942,599
FREQUENCY CONTROL DEVICE
Filed Aug. 31, 1929   5 Sheets-Sheet 5
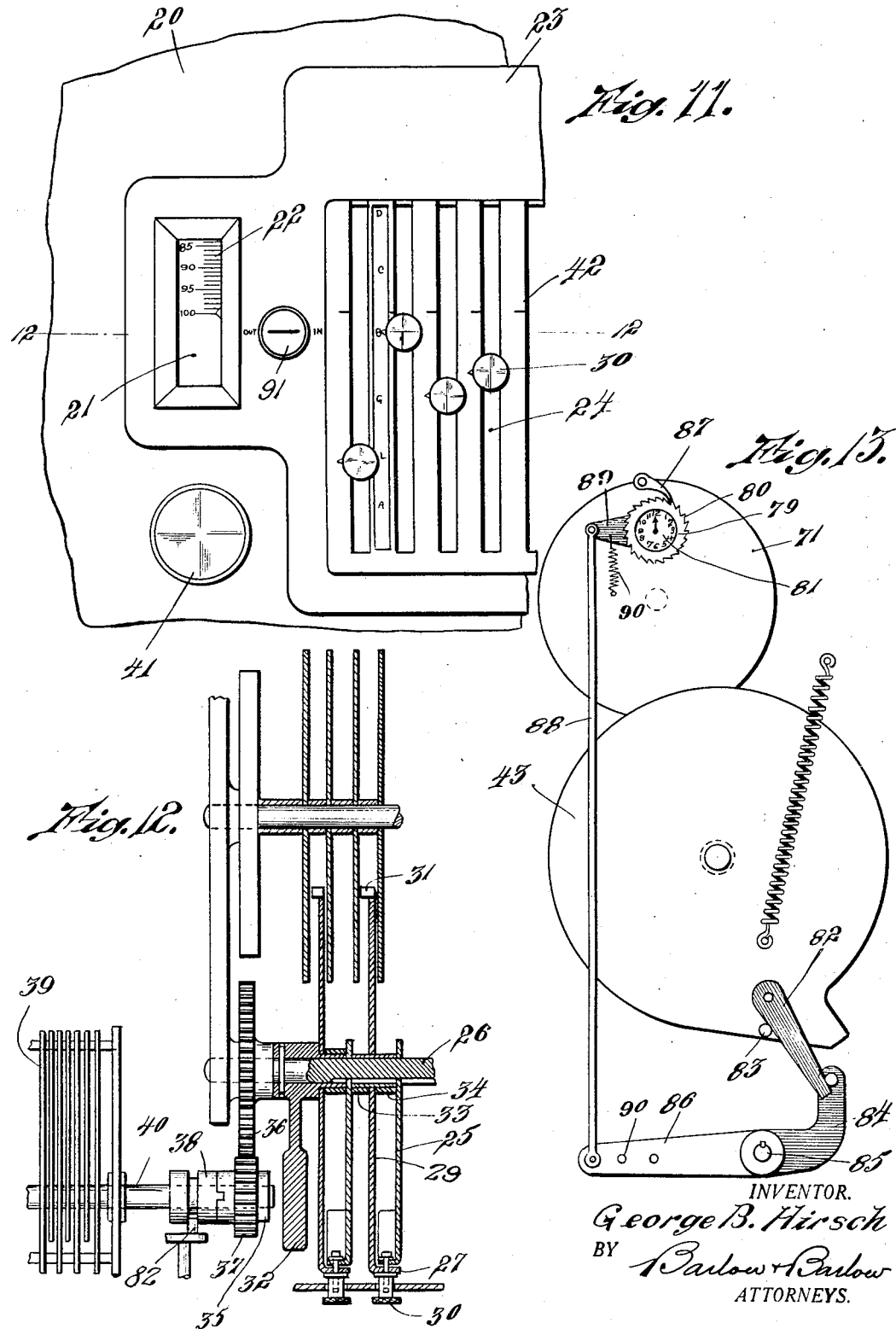
INVENTOR.
George B. Hirsch
BY Barlow & Barlow
ATTORNEYS.

Patented Jan. 9, 1934

1,942,599

UNITED STATES PATENT OFFICE 1,942,599

FREQUENCY CONTROL DEVICE

George B. Hirsch, Pawtucket, R. I.

Application August 31, 1929. Serial No. 389,846

4 Claims. (Cl. 250—20)

My present invention relates to automatic time-responsive setting mechanism for selective timing of electrical circuits, and has particular reference to mechanism for responding to a predetermined frequency at a predetermined time.

One object of my invention is to provide mechanism which will automatically adjust an electric circuit for response to a predetermined frequency at a predetermined time.

Another object of my invention is to provide mechanism for changing the adjustment setting at a predetermined time.

A further object is to provide mechanism permitting a desired sequence of adjustment settings.

An additional object is to provide for automatic change from one setting position to another setting position after a predetermined time interval.

Another additional object is to provide mechanism for a series of adjustments wherein each adjustment will set the time at which the succeeding adjustment will be made.

A still further object is to provide mechanism for placing the automatic adjusting control in inoperative position whenever desired.

Other objects and advantageous features will be readily apparent from the detailed description following, in conjunction with the accompanying drawings, and will be particularly pointed out in the appended claims.

In the drawings:

Fig. 1 is a vertical central section through my improved control mechanism, certain parts being omitted for clearness;

Fig. 5 is a perspective view of a control disk and the associated mechanism;

Fig. 6 is a perspective view of the positioning, locking and releasing lever assembly;

Fig. 7 is a detail view showing the mechanism for returning the locking disk to initial position;

Fig. 8 is a perspective detail of the setting quadrant and lever;

Figs. 9 and 10 are perspective details of a timing disk, showing both sides thereof;

Fig. 11 is a front elevation, partly broken away, of the setting mechanism;

Fig. 12 is a fragmental central horizontal section on the line 12—12 of Figure 10, the gears and tuning device being displaced; and Fig. 13 is a diagrammatic detail showing one form of time-setting mechanism.

Figure 2:
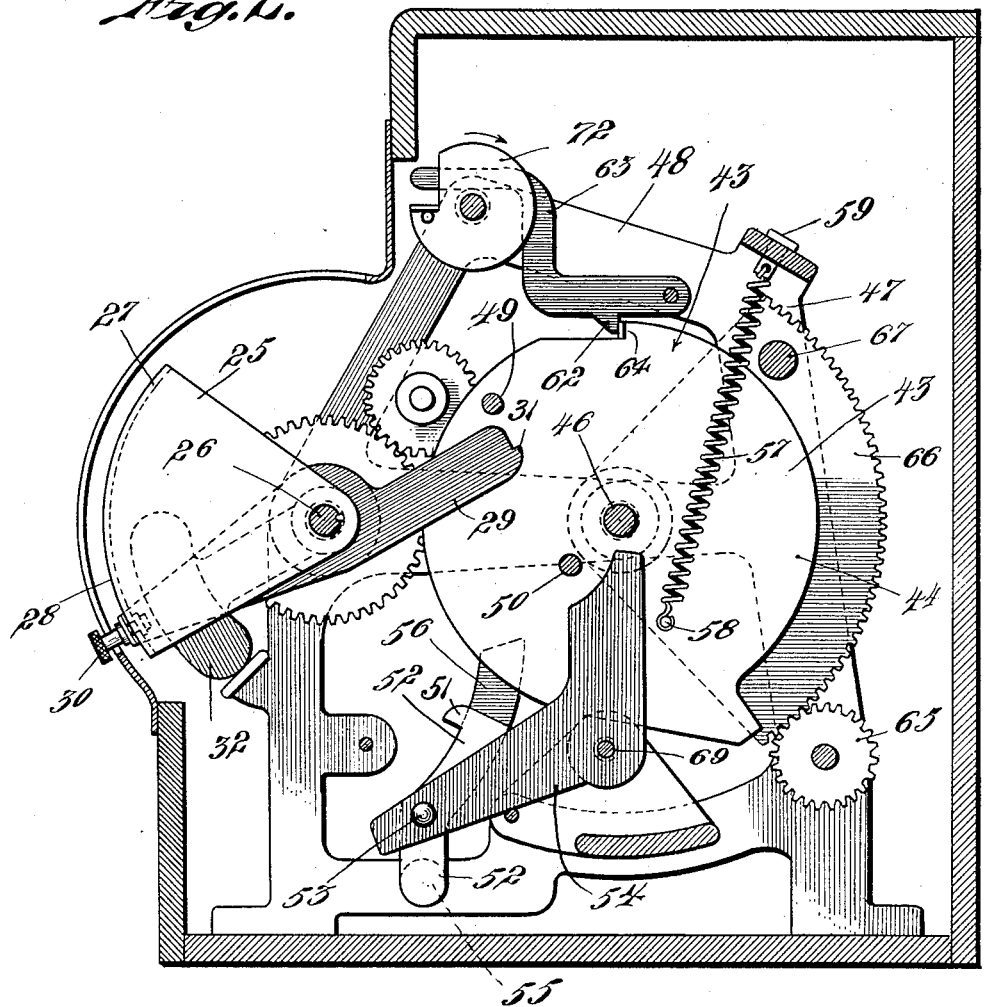
Fig. 2 is a transverse section on the line 2—2 of Figure 1, showing a control disk in initial position.

Mechanisms have heretofore been devised for manually operated automatic selecting or adjusting mechanism for controlling an electrical circuit for response to a predetermined wave length; such devices, however, have required manual resetting whenever a change to a different wave length was desired. I have devised a fully automatic adjusting device which may be initially set for any predetermined frequencies, in any predetermined sequence, at any predetermined time, for any predetermined intervals, and which will adjust the electric circuit to each predetermined frequency in the predetermined sequence at the predetermined time; and the following is a detailed description of one specific structural embodiment of my invention which is particularly suitable for the automatic tuning of radio receiving sets.

General description

Referring to Figure 11, a radio receiving set 20 having the usual tuning wheel 21 with tuning graduations 22 thereon, is equipped with an additional casing 23 containing my improved automatic tuner. A series of vertically disposed slots 24 in the casing 23 each contain a selector quadrant 25, shown in Figure 8, the quadrants being keyed to a common shaft 26 which is rotatably mounted in the casing 23. Each quadrant has an arcuate top 27 with a longitudinal slot 28 therein; a selector lever 29, rotatably mounted on the shaft 26, has a manually operated lock nut 30 at one end which slidably engages the slot 28, and is provided with a setting lip 31 at the opposite end.

The shaft 26, as shown in Figure 12, has a weight 32 keyed thereto, for normally urging the selector quadrants and the selector levers to neutral position; a series of spacers 33 and 34 respectively serve to properly space the quadrants and levers. The shaft 26 is operatively connected to a stub shaft 35, suitably mounted in the casing, by means of reduction gearing 36, 37; the stub shaft 35 is detachably engageable with the tuning device of the radio set through a manually controlled clutch 38, the tuning device in the embodiment illustrated comprising the usual condenser plates 39 and a control shaft 40 therefor.

Considering Figure 12, the weight 32 normally retains the spaced quadrants and levers in neutral position. A desired station may be set by first manually adjusting the tuning wheel 21 by means of the usual knob 41, illustrated in Figure 11. The clutch 38 being in coupled position, this rotation of the tuning wheel 21 turns the shaft 26 and moves all the selector quadrants to setting position, this movement of the quadrants being relatively small due to the use of the reduction gearing. A lock nut 30 may now be shifted to a point opposite the indicator pointer 42 and locked in position on the quadrant, thus setting the corresponding selector lever 29 in position for locking, as hereinafter described.

The locking mechanism

The locking mechanism includes a series of control disks 43 each comprising two parallel spaced plates 44, 45, best shown in Figure 5, the plates being secured together and rotatably mounted on a common shaft 46 positioned in bearing standards 47 (see Fig. 1) which are preferably integral with a supporting frame 48. Between the two plates 44, 45, are positioned a selector lever engaging pin 49 and a positioning lever engaging pin 50. A rotating movement of a disk 43 in a counter-clockwise direction serves to engage its pin 49 with the corresponding selector lever 29 (see Fig. 2) to move the selector lever downwardly into position for locking by engagement of the setting lip 31 with the tooth 51 of a lock lever 52.

Each lock lever 52 (see Fig. 6) is pivotally mounted at 53 to a positioning lever 54 and is weighted at 55 to normally swing into locking position. A release lever 56 is secured to each lock lever by welding or the like, and functions as hereinafter described.

Each disk 43 has an actuating spring 57 positioned between the two plates forming the disk, the spring being secured at one end to a pin 58 in the disk and at the other end to a stud member or the like 59 which is positioned in a cross bar 60 of the frame 48; the disk is releasably retained in actuating position by the engagement of a retaining lip 61 on the plate 44 with a retaining tooth 62 on a latch lever 63 pivoted on the frame 48.

The spring 57 is placed under tension by coupling a handle 64 in operative position (see Fig. 1) to rotate a gear 65, suitably mounted in the frame 48, and turn geared segments 66, best shown in Figure 7. The geared segments have a loading rod 67 secured therebetween engageable with a tooth 68 on each disk 43 to rotate the disks until the lip 61 and tooth 62 engage to retain the disk against the tension of the spring 57.

Figure 3:
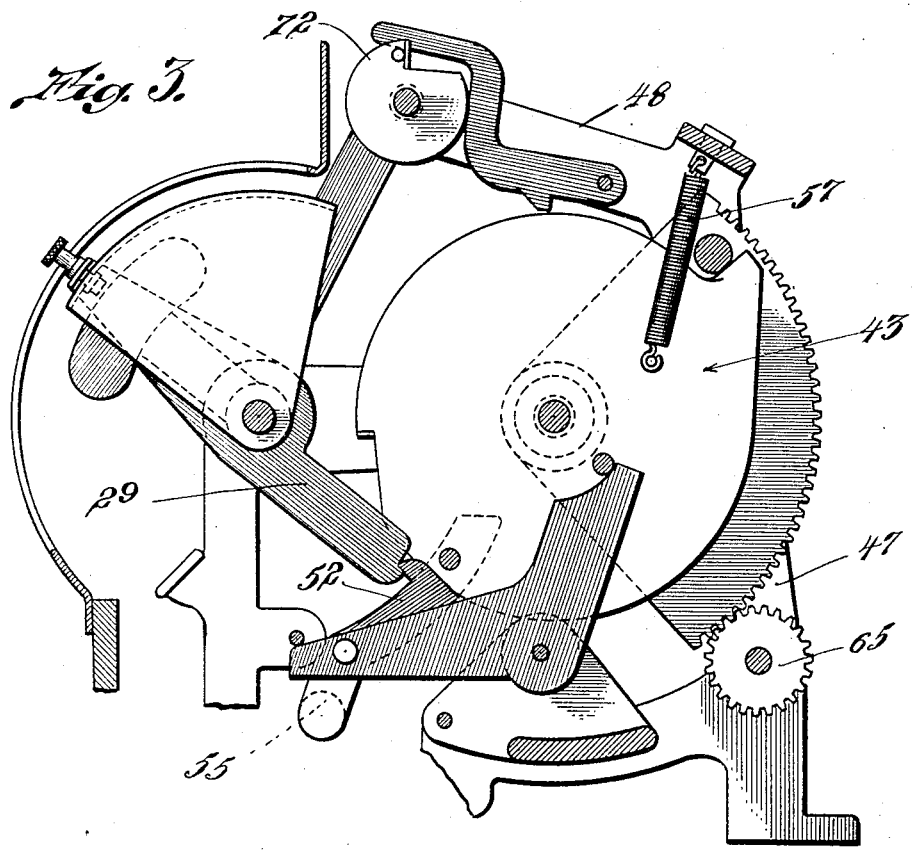
Fig. 3 is a transverse section similar to Figure 2, showing the control disk in set position.
Figure 4:
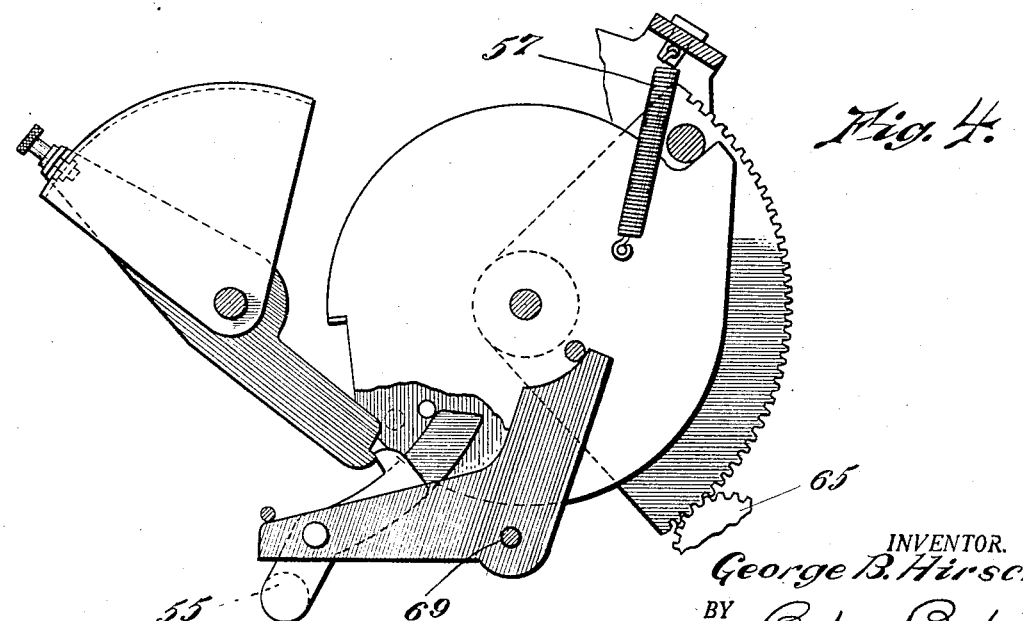
Fig. 4 is a detail view, partly in section, similar to Figure 3, the control disk being partly broken away to show the release pin on the next adjacent control disk.

Referring now to Figs. 2, 3 and 4, an upward movement of lever 63 in response to actuation by a timing device hereinafter described releases the retaining lip 61 and thus permits disk 43 to rotate in response to the pull of spring 57. The positioning pin 50 then engages the upper end of positioning lever 54, as shown in Figure 3, rotating the positioning lever on a common positioning lever shaft 69 which is suitably mounted in the frame 48. The lock lever 52 is thereby shifted into engaging position, as shown in Figure 3.

The selector lever 29 has meanwhile been contacted by the selector lever engaging pin 49 for rotating into engagement with the lock lever 52, the rounded engaging portions swinging the lever 52 outwardly until the lip 31 clears the lock tooth 51, the weight 55 now returning the lever 52 inwardly into locking position.

Each control disk 43 therefore serves to lock a selector quadrant in a set position; as each disk rotates to lock its particular selector quadrant, the preceding quadrant and its locking mechanism is released from locked position in order to return the selector quadrants to the neutral position for reengagement and relocking.

This unlocking operation is effected by a releasing pin 70 on each plate 45 which is set in advance of the pin 49 to engage the releasing lever 56, which, as shown in Figure 1, is positioned between adjacent disks 43 and rotates its associated lock lever 52, as shown in Figure 4, to release the locked selector lever 29 and permit the weight 32 to bring the selector quadrants back to neutral position. If desired, the weight 32 may be divided into a plurality of weights positioned along the shaft 26.

Timing mechanism

The timing mechanism includes a suitable timing device 71, (see Fig. 1) which periodically actuates a timing disk 72 through the hub section 73 thereof. A bearing rod 74 is positioned in the frame 48 and supports a plurality of spaced timing disks 75 thereon, generally similar in structure and arrangement to timing disk 72. Each disk includes two spaced plates 76, 77, having a tripping pin 78 secured therebetween for tripping the associated lever 63. Each plate 76 has a laterally extending pin 78 for rotatably engaging an oppositely extending lip 79 on the adjacent plate 77 of the succeeding timing disk.

The periodic actuation of disk 72 by the timing device 71 releases its lever 63 to permit tuning in accordance with the setting of the first quadrant; each succeeding actuation of disk 72 causes one additional disk 75 to turn which permits tuning in accordance with the setting of the corresponding quadrant.

If desirable, an automatic time-setting device, such as shown in Figure 13, may be incorporated. A time-setting device 79 which includes ratchet teeth 80 of any desired spacing, is removably interchangeably mounted on a shaft 81 which controls the setting of the timing device 71. This setting device is periodically set upon release of each control disk 43 by movement of a lever 82 pivotally carried by each disk. Each lever 82 freely rotates on its pivot, but is stopped by a stop pin 83 in operative position to engage with one end of a lever 84 keyed to a common shaft 85 on which these levers 84 are mounted and which is suitably positioned in the frame 48. The rotation of shaft 85 turns a lever 86 to actuate the pawl 87 and rotate the time-setting device 79 through the intermediate rod 88 and the spring-tensioned bell crank 89. The end of rod 88 is adjustably positioned in openings 90 in lever 86, to vary the effective throw of pawl 87 and change the time interval between settings.

General operation

The operator first determines a definite sequence of desired stations, then sets the tuning wheel 21 in neutral position, which is designated as 100 in Figure 11, and engages the clutch 38 by turning the control button 91, shown in Figure 11, from horizontal to vertical position, thus turning the eccentric 92, see Figure 12, to engage the clutch; the operator then sets the weel 21 at each station wave length and locks the lock nuts 30 of successive selector quadrants adjacent the setting marks, starting from the right, as the tuning wheel is set for the successive stations. At the proper predetermined time, the timing device 71 actuates timing disk 72, thus releasing the first control disk 43, which turns to position the first lock lever and to move the first selector lever 29 into locking engagement with the lock lever. This movement of the control disk 43 may also actuate the time-setting device 79 to control the next actuating movement of the timing device 71.

After a predetermined time interval, the timing device 71 again actuates disk 72, which now turns the first disk 75, thus releasing the second control disk 43; the initial movement of the second control disk, through releasing pin 70, moves releasing lever 56 to release the first selector lever 29 and permit the selector quadrants to return to neutral position under the influence of weight or weights 32.

The movement of the second disk 43 then continues to cause positioning pin 50 to engage positioning lever 54 and place the second lock lever 52 in locking position; the pin 49 has meanwhile engaged the second selector lever 29 during this period and moves the second selector lever downwardly into locking engagement with the second lock lever 52. The receiving set is now adjusted to receive wave lengths corresponding to the second station desired; the movement of disk 43 may also set the time-setting device 79 in position for the next adjustment.

Each station is therefore set in predetermined sequence at a predetermined time. The receiving instrument may also be manually set by disconnecting the coupling 38 and tuning in manually to obtain a desired station. To place the control disks in their initial operative position, the handle 64 is coupled to the gear 65 to turn the control disks against the tension of their springs until the retaining teeth 62 engage the retaining lips 61.

While I have described a specific embodiment of a tuning device constructed in accordance with the principles of my invention, it is obvious that these principles may be applied to the control of frequencies in any electrical circuit, and that changes in structure and in arrangement may be made without departing from the spirit of the invention as defined in the appended claims.

I claim:

1. In a frequency control device for an electric circuit, mechanism for changing the circuit frequency, a shaft operatively connected to said mechanism, a plurality of selector elements secured to said shaft, a plurality of selector members pivotally mounted on said shaft and adjustably secured to said selector elements, a second shaft parallel to said first shaft, means on said second shaft for locking the selector members in position for operating the mechanism for changing the circuit frequency, said locking means comprising two parallel spaced plates for each selector member, and a timing device for controlling the operation of said locking means.

2. In a frequency control device for an electric circuit, mechanism for changing the circuit frequency, a shaft operatively connected to said mechanism, a plurality of selector elements secured to said shaft, a plurality of selector members pivotally mounted on said shaft and adjustably secured to said selector elements, a second shaft parallel to said first shaft, means on said second shaft for locking the selector members in position for operating the mechanism for changing the circuit frequency, said locking means comprising two parallel spaced plates for each selector member, and a timing device for periodically controlling the operation of said locking means.

3. In a frequency control device for an electric circuit, mechanism for changing the circuit frequency, a shaft operatively connected to said mechanism, a plurality of selector elements secured to said shaft, a plurality of selector members pivotally mounted on said shaft and adjustably secured to said selector elements, a second shaft parallel to said first shaft, means on said second shaft for locking the selector members in position for operating the mechanism for changing the circuit frequency, said locking means comprising two parallel spaced plates for each selector member, and a timing device for periodically controlling the sequence of the operation of said locking means.

4. In a frequency control device for an electric circuit, mechanism for changing the circuit frequency, a shaft operatively connected to said mechanism, a plurality of selector elements secured to said shaft, a plurality of selector members pivotally mounted on said shaft, means for adjustably securing said selector members to said selector elements, a second shaft parallel to said first shaft, means on said second shaft for locking the selector members in position for operating the mechanism for changing the circuit frequency, said locking means comprising two parallel spaced plates for each selector member, and a timing device for controlling the operation of said locking means.

GEORGE B. HIRSCH.